March 3, 1964     O. BLECHSCHMIDT     3,122,779
APPARATUS FOR SUPPORTING SAUSAGE CASINGS
Filed March 10, 1961
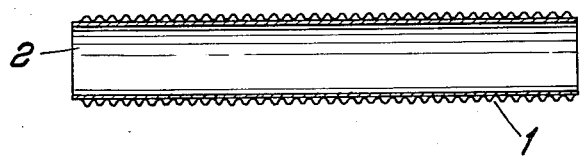
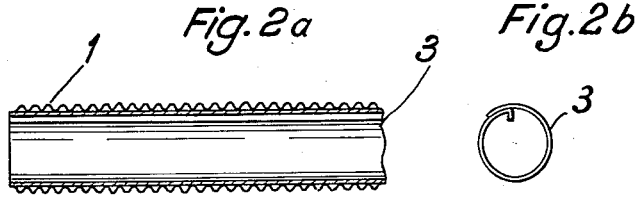
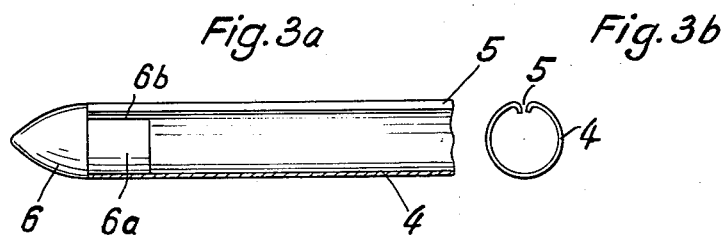
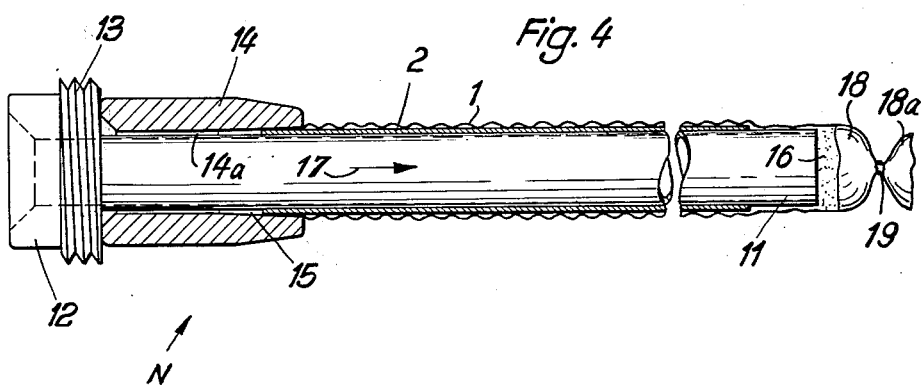
Inventor:
OTTO BLECHSCHMIDT
BY Michael S. Striker
ATTORNEY

United States Patent Office 3,122,779
Patented Mar. 3, 1964

3,122,779
APPARATUS FOR SUPPORTING SAUSAGE CASINGS
Otto Blechschmidt, Am Walde 10, Dortmund-Kirchhorde, Germany
Filed Mar. 10, 1961, Ser. No. 94,889
Claims priority, application Germany, Mar. 12, 1960
1 Claim. (Cl. 17—41)

The present invention relates to a method of supporting sausage casings in storage and in sausage manufacturing apparatus. The invention also relates to improvements in sausage manufacturing apparatus, and to devices for supporting sausage casings in storage or in the sausage manufacturing apparatus.

In accordance with the prevailing practice of processing natural sausage casings, bundled casings are stored in dried and salted condition. In a sausage manufacturing plant, the casings are soaked in water to wash away the salt, whereupon the bundles are stretched and the individual casings are placed into water-filled receptacles. Such work requires substantial skill, patience and time because the casings tend to tangle and/or to form knots and, once tangled, they can be separated only by tearing apart which produces short ends and results in substantial losses. Furthermore, substantial losses in time are incurred when the ends of individual casings are placed onto the nozzle of an automatic sausage manufacturing apparatus because the apparatus must be brought to a halt during the application of a new casing. Consequently, the capacity of such automatic apparatus is seldom utilized to more than 50 percent.

An important object of the present invention is to provide a support for sausage casings which renders it possible to put automatic sausage manufacturing apparatus to a more efficient use.

Another object of the invention is to provide a support for sausage casings which may be directly connected with the sausage manufacturing apparatus so that the casings may be taken from storage and attached to the appratus without requiring any processing prior to the filing with a meaty or like mixture.

A further object of the invention is to provide a support for sausage casings which is capable of storing a very long casing while occupying little space, and which can be produced of readily available materials at a very low cost.

An additional object of my invention is to provide a device for the production of supports for sausage casings.

A concomitant object of the invention is to provide an improved sausage forming nozzle which may be utilized with supports of the above outlined characteristics.

Still another object of the invention is to provide a method of preparing sausage casings for storage or for attachment to sausage manufacturing apparatus which may be practiced by semiskilled persons, which results in substantial savings in time, and which eliminates the danger of damage to casings prior to or in actual manufacture of sausages.

With the above objects in view, the invention resides in the provision of a method which comprises the steps of forming a tubular support, placing onto the support a sausage casing whose length exceeds the length of the support so that the casing forms a series of circumferential corrugations and assumes the shape of a bellows on the support, placing the support onto and securing it to the nozzle of a sausage manufacturing apparatus, and introducing a meaty or like mixture into the casing by simultaneously permitting the casing to expand as it is drawn off its support.

Certain other features of the invention reside in the provision of a device for producing a tubular support for the sausage casing, in the provision of a specially constructed nozzle which is capable of firmly retaining the support in actual manufacture of sausages, and in the provision of a method for the production of tubular supports for sausage casings.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawing, in which FIG. 1 is a longitudinal central section through a tubular support for an elongated sausage casing;

FIG. 2a is a longitudinal central section through a modified support with a sausage casing thereon;

FIG. 2b is an end view of the modified support;

FIG. 3a is a partly elevational and partly sectional view of a device for the production of tubular supports of the type shown in FIGS. 2a and 2b;

FIG. 3b is an end view of a component of the device shown in FIG. 3a; and

FIG. 4 is a partly elevational and partly sectional view of a nozzle which forms part of a sausage manufacturing apparatus, a support of the type shown in FIG. 1 being mounted on and being secured to the nozzle.

Referring now in greater detail to the drawing, and first to FIG. 1, there is shown a thin-walled metallic, plastic, wooden or paper tube 2 which constitutes a support for a length of cleaned and sorted sausage casing or skin 1. As shown, the casing 1 assumes the form of a circumferentially corrugated bellows whose length, in expanded condition, greatly exceeds the length of the support 2.

FIGS. 2a and 2b illustrate a support 3 which is formed by coiling a metallic, plastic or paper like foil so as to form a tubular body which receives a bellows-like sausage casing 1. The support 3 is preferably produced in a device of the type shown in FIGS. 3a and 3b. This device comprises a tubular shell 4 which is formed with a longitudinal slot 5 adapted to receive one longitudinal edge portion of a foil, whereupon the foil is convoluted about the periphery of the shell 4 to form a support 3 of the type shown in FIGS. 2a and 2b. In order to facilitate the application of a sausage casing 1, the shell 4 is provided with a preferably conical head 6 whose stem 6a extends into one open end of the shell and is retained therein by friction or in any other suitable manner. It will be noted that a segmental portion of the stem 6a is cut away, as at 6b, so as to permit insertion of the stem into the shell 4 and of a foil into the slot 5. However, the flat portion 6b of the stem 6a approaches the edges of slot 5 closely and serves as a means for properly retaining an edge portion of the foil in the slot 5 so that the support 3 cannot unroll.

In the production of supports, one longitudinal edge portion of say a paper foil or sheet is inserted into the slot 5 and the foil is thereupon coiled about the shell 4 to form a tubular body. The free longitudinal edge may, but need not, be glued or otherwise secured to the foil portion therebeneath. In the next step, the head 6 is introduced into one end of a sausage casing 1, and the casing is thereupon pushed onto the support 3 until it assumes a shape as shown in FIG. 2a. The support 3 is then withdrawn from the shell and is ready for storage in brine or for application to the nozzle of a sausage manufacturing apparatus. For example, the length of the casing 1 in extended condition may be 10 or 20 meters so as to serve for the production of a predetermined number of sausages of a given length.

FIG. 4 illustrates the nozzle N of a sausage manufacturing apparatus which embodies means for firmly retaining a support 2 of the type shown in FIG. 1. The nozzle N comprises an elongated hollow cylindrical body 11 one end of which is formed with a reinforced zone or boss 12 having external threads 13 which may be screwed into an automatic sausage manufacturing apparatus, not shown. The cylinder 11 is surrounded by a shorter retaining member in the form of a clamping sleeve 14 which may abut against the boss 12 and which is formed with a bore 14a whose diameter preferably slightly exceeds the outer diameter of the cylinder 11. The forward end of the bore 14a diverges conically outwardly, as at 15, so as to receive the adjacent end portion of the support 2 when the latter is pushed into the clamping sleeve 14 or the clamping sleeve is moved onto the support 2 away from boss 12, the support 2 is tightly clamped between the periphery of the cylinder 11 and the wall of the conical bore end 15. The interior of the cylinder 11 serves as a passage for a meaty or like mixture 16 which is expelled in a direction of the arrow 17 to fill the casing 1 which is continuously withdrawn from its support 2. Thus, a sausage 18 is produced at the free end of the cylinder 11 and, by causing the nozzle N to perform one or more revolutions at predetermined intervals, the casing is twisted, as at 19, to separate a completed sausage 18a of predetermined length from a newly formed sausage 18.

An important advantage of the nozzle N is that it prevents relative movement between the cylinder 11 and the support 2 when the apparatus is in actual use. As is known, the rotation of the cylinder 11 to form the twisted skin portions 19 occurs suddenly and, without a satisfactory connection between the cylinder and the support, the former could revolve without bringing about a twisting of the skin. As a rule, the twisted zones 19 need not be tied by strings or the like.

Of course, when the production of sausages is carried out in the conventional manner, i.e. without the support 2, the rear end of a casing is secured directly to the cylinder 11. However, the provision of my novel support presents a number of important advantages which fully compensate for the necessity of utilizing a clamping or retaining sleeve 14. For example, particular care must be exercised when a nonsupported sausage casing is applied to the nozzle of an automatic sausage manufacturing apparatus because the danger of puncturing or ripping the casing is ever-present. Such careful application of the casing requires much time, whereas the application of a support 2 or 3 can be completed substantially without any losses in time. In other words, an empty support may be replaced by a loaded support at such a rate of speed that the interruption in the production of sausages during such replacement is reduced to a minimum. Thus, the apparatus may be operated at or near its full capacity. Furthermore, the casing carried by a tubular support may be discharged therefrom and filled at a uniform rate so that the product is of uniform density and appearance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adapatations should and are intended to be comprehended within the meaning and range of equivalence of the following claim.

What is claimed as new and desired to be secured by Letters Patent is:

As a novel article of manufacture, a device for the transformation of metallic, plastic and like foils into tubular supports for sausage casings, said device comprising an open-ended tubular shell having an elongated slot adapted to receive an edge portion of a foil whereby the foil may be rolled onto the shell to form a tubular support for the sausage casing, and a substantially conical head for facilitating the application of a sausage casing to the support, said conical head having a stem portion extending into one end of said shell for connecting said conical head thereto and for engaging a part of said edge portion of the foil to retain said edge portion in said tubular shell during the rolling step.

References Cited in the file of this patent

UNITED STATES PATENTS

| | | |
|---|---|---|
| 990,547 | Gunuskey | Apr. 25, 1911 |
| 1,285,044 | Clay | Nov. 19, 1918 |
| 1,538,460 | Brecht | May 19, 1925 |
| 1,797,137 | Gochnauer | Mar. 17, 1931 |
| 1,876,279 | Dietrich | Sept. 6, 1932 |
| 1,938,070 | Friedler | Dec. 5, 1933 |